US008109451B2

(12) United States Patent
Mazzola

(10) Patent No.: US 8,109,451 B2
(45) Date of Patent: Feb. 7, 2012

(54) SHOWER SPRAY DEVICE AND RELATED DELIVERY NOZZLES

(75) Inventor: Giovanni Maria Mazzola, Valduggia (IT)

(73) Assignee: Ergon S.r.l., Valduggia (VC) (IT)

( * ) Notice: Subject to any disclaimer, the term of this patent is extended or adjusted under 35 U.S.C. 154(b) by 65 days.

(21) Appl. No.: 12/367,696

(22) Filed: Feb. 9, 2009

(65) Prior Publication Data

US 2009/0218420 A1 Sep. 3, 2009

(30) Foreign Application Priority Data

Feb. 29, 2008 (IT) .............................. MI2008A0338

(51) Int. Cl.

| | |
|---|---|
| ***A62C 2/08*** | (2006.01) |
| ***A62C 31/02*** | (2006.01) |
| ***B05B 1/14*** | (2006.01) |
| ***B05B 1/00*** | (2006.01) |
| ***F16B 35/00*** | (2006.01) |

(52) U.S. Cl. ..................... 239/600; 239/548; 239/553.5; 239/589; 239/590.3; 239/596; 411/395

(58) Field of Classification Search ............. 239/533.13, 239/533.14, 548, 552, 553, 553.3, 553.5, 239/555, 562, 589, 590.3, 596, 600, 602; 411/395

See application file for complete search history.

(56) References Cited

U.S. PATENT DOCUMENTS

| | | | | |
|---|---|---|---|---|
| 4,221,336 | A * | 9/1980 | Diamond | 239/428.5 |
| 4,379,097 | A * | 4/1983 | Leggett | 261/78.2 |
| 6,250,572 | B1 * | 6/2001 | Chen | 239/602 |
| 7,721,979 | B2 * | 5/2010 | Mazzola | 239/533.14 |
| 2006/0163391 | A1 * | 7/2006 | Schorn | 239/596 |
| 2007/0200013 | A1 | 8/2007 | Hsiao | |
| 2009/0200404 | A1 * | 8/2009 | Cristina | 239/562 |

FOREIGN PATENT DOCUMENTS

| | | | |
|---|---|---|---|
| EP | 0362489 | A | 4/1990 |
| EP | 0587991 | A | 3/1994 |
| EP | 2095878 | B1 | 1/2011 |
| WO | 2007113863 | A | 10/2007 |

* cited by examiner

*Primary Examiner* — Jason Boeckmann
*Assistant Examiner* — Ryan Reis
(74) *Attorney, Agent, or Firm* — Hess Patent Law Firm, PC; Robert J. Hess

(57) ABSTRACT

There is described a shower spray device including a lower plate with a plurality of nozzles and an upper plate with an inlet for the water supply. An elastic sealing element is interposed between the two plates to delimit therewith a chamber for distributing water to the nozzles. To maintain the correct pressure of the two plates, clamping screws are used also having the function of delivery nozzles, i.e. screws formed by threaded pins having an axial duct, with an outlet open towards the outside to allow water delivery, and at least one transverse duct to place the distribution chamber in fluid communication with the axial duct for water delivery.

6 Claims, 3 Drawing Sheets

SHOWER SPRAY DEVICE AND RELATED DELIVERY NOZZLES

BACKGROUND OF THE INVENTION

The present invention relates to a shower spray device and to a particular type of nozzle for delivering water intended for this spray device.

Shower spray devices of known type generally comprise a water distribution chamber in fluid communication with at least one inlet and with a plurality of outlet nozzles for water delivery. Some embodiments are also provided with intakes to allow suction of a certain quantity of air into the distribution chamber and allow a certain aeration of the delivered water.

According to latest trends, shower spray devices are currently being studied in terms of appearance and the type of jet requested. For example, spray devices having a design with simple clean-cut lines are generally popular, as well as spray devices that produce a "rain" type jet, with or without aeration of the water delivered.

The patent application No. EP-A1-1637231 by the same Applicant proposed a shower spray device formed by a lower plate, in which the water delivery nozzles are mounted, by an upper plate in which the inlet for the supplying water to the distribution chamber is obtained, and by an elastic sealing element, for example an O-ring, interposed between the two plates. The spray device is mounted by means of a central coupling element, also provided with water supply channels, which clamps the two plates together thus exerting pressure on the elastic sealing element interposed therebetween.

This solution has proved effective to satisfy the requirements of simple construction and limited costs, also obtaining a slim-line product which is particularly appreciated by the market.

However, when the dimensions of the spray device are increased, the problem arises of ensuring even distribution of the water to all the delivery nozzles and optimal peripheral seal, above all in view of the fact that, when the dimensions increase, the elastic sealing rings can have considerable constructional tolerances even within a same production batch, or even a non-uniform modulus of elasticity along various portions of the same ring.

For example, considering for simplicity the case of circular spray devices, the solution known from the aforesaid European patent application is effectively adapted to produce spray devices up to 50 cm in diameter, while problems of seal and/or uniform delivery can occur for larger diameters.

Moreover when the diameter, or in any case the dimensions of the spray device, is increased, correct positioning of the elastic sealing element prior to clamping of the two plates, performed using the central coupling, becomes increasingly difficult. These constructional difficulties can also influence the production costs of spray devices.

SUMMARY OF THE INVENTION

An object of the present invention is to propose a shower spray device which can be produced with large surface dimensions, and therefore with a high number of delivery nozzles, ensuring at the same time uniform water distribution to all the nozzles and excellent peripheral seal of the distribution chamber, regardless of the characteristics of the sealing ring used and/or of the dimensions of the spray device.

Another object of the present invention is to propose a shower spray device of the aforesaid type which can be produced with a particularly thin section and large surface extension.

A further object of the present invention is to propose a shower spray device of the aforesaid type which in any case has a particularly simple construction and therefore which can be produced at limited costs.

These objects are achieved by the present invention, which relates to a shower spray device including at least one lower plate, in which a plurality of water delivery nozzles are mounted, at least one upper plate, in which at least one inlet for the water supply is formed, at least one elastic sealing element, interposed between the two plates, to delimit therewith a chamber for distributing water to the nozzles, and screw means for clamping the elastic sealing element between the two plates.

According to the present invention, the screw means include a plurality of threaded pins having at least one axial duct with an outlet open towards the outside to allow water delivery and at least one transverse duct to place the distribution chamber in fluid communication with the axial duct for water delivery.

In practice, the same threaded pins used to maintain the plates in close contact with the elastic sealing element also perform the function of delivery nozzles.

In the preferred embodiment, the threaded pins are inserted in through holes of the lower plate and are provided with a head portion suitable to abut against the outer surface of this plate. The remaining portion of the pins has a threaded outer portion which allows them to engage in internally threaded holes of the upper plate.

The pins are preferably installed along a closed perimeter line which surrounds the delivery nozzles in appropriate reciprocal positions according to requirements.

In this manner, the plates exert sufficient pressure on the entire elastic sealing element, regardless of its dimensions and of the dimensions of the spray device, thus ensuring correct distribution of delivery and optimal seal along the entire perimeter line of the spray device.

Another advantage of the solution proposed with the present invention is to be able to further decrease the thickness of the plates, or at least of the lower plate which supports the nozzles, thereby decreasing the weight of the spray device and consequently the cost of the material required to produced it.

The steps to mount the spray device are also particularly facilitated. In fact, after having inserted the threaded pins in the through holes of the lower plate, the elastic sealing element can be positioned correctly using the pins as reference or as a support for this sealing element, regardless of its dimensions and of the shape in plan view of the spray device.

The invention also relates to a water delivery nozzle formed by a threaded pin having at least one axial duct with an outlet open towards the outside to allow water delivery, and at least one transverse duct to place the distribution chamber of a shower spray device in fluid communication with the axial duct for water delivery.

BRIEF DESCRIPTION OF THE DRAWING

The invention shall now be described, by way of non-limiting example, with reference to the appended drawings, wherein.

DETAILED DESCRIPTION OF THE INVENTION

Figure 1:
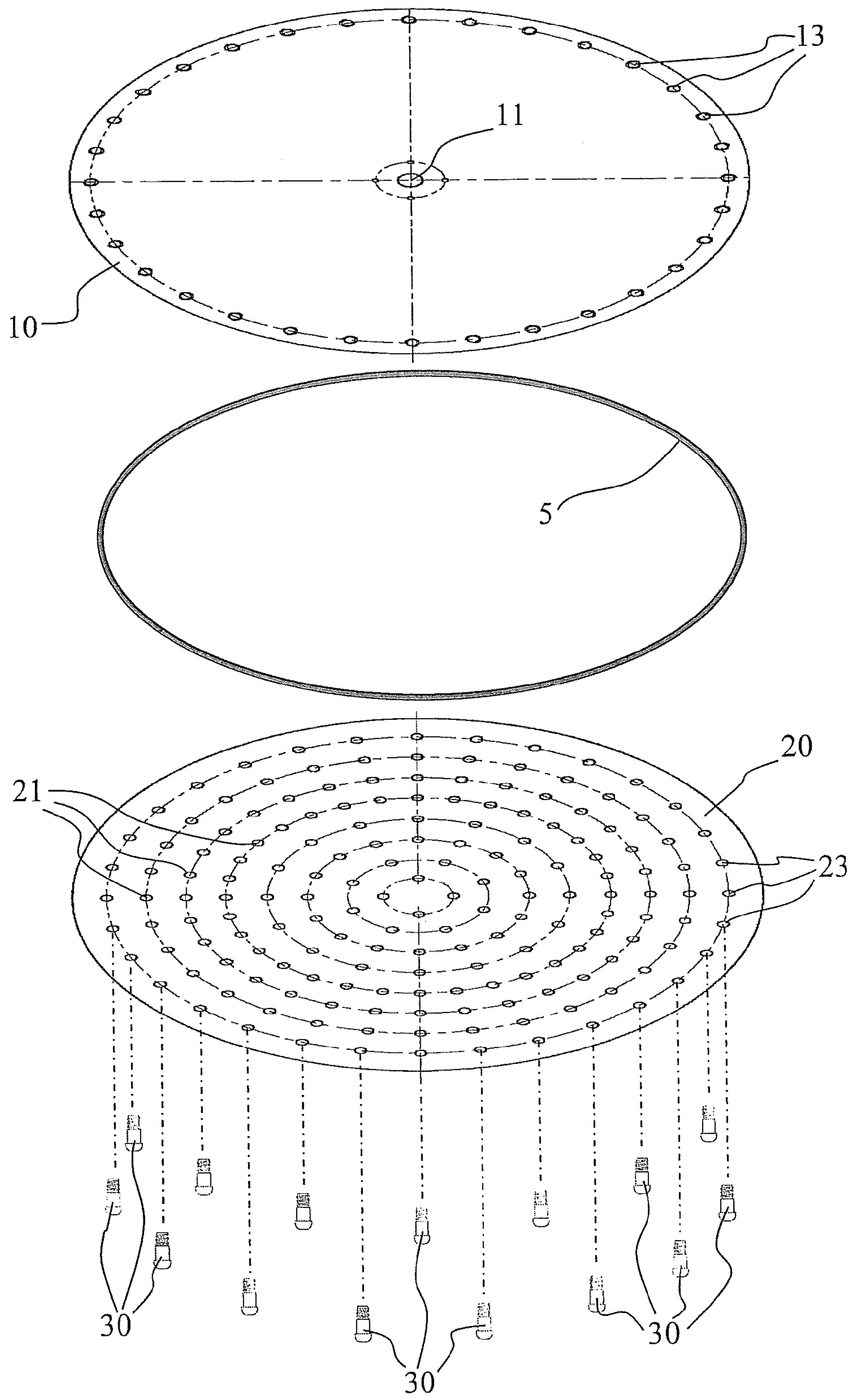
FIG. 1 shows a perspective view of a spray device in unassembled condition according to a possible embodiment of the present invention.

The view of FIG. 1 shows some of the components of a spray device according to a possible embodiment of the present invention.

The upper plate 10 includes an inlet 11 for water supply to the distribution chamber of the spray device and a plurality of threaded holes 13 positioned in proximity to the peripheral portion of the plate 10.

The lower plate 20 is provided with through holes 21 for mounting the delivery nozzles 40 (FIG. 5) and through holes 23 in positions corresponding exactly to the through holes 13 on the plate 10.

The two plates 10 and 20 can be made, for example, of steel or other rigid metal, ceramic or plastic materials suitable for this use.

An elastic sealing element 5, for example a closed O-ring, is interposed between the two plates 10 and 20 to delimit therewith a chamber for water distribution towards the delivery nozzles.

To clamp the elastic sealing element 5 between the two plates 10 and 20 screw means 30 are used, not only having the function of clamping, but also that of delivery nozzle. For clarity, the view of FIG. 1 only shows some of the screw means 30, but it is evident that in the embodiment represented these must be the same in number as the number of threaded holes 13 on the upper plate.

Figure 2:
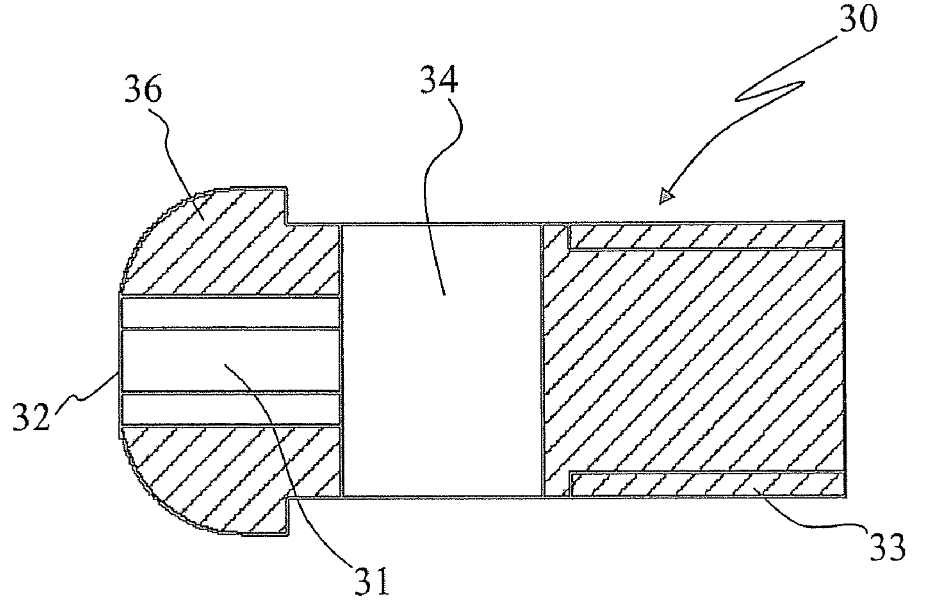
FIGS. 2 and 3 are section views according to respectively orthogonal planes of a clamping screw having the function of a nozzle such as those shown in FIG. 1.
Figure 3:
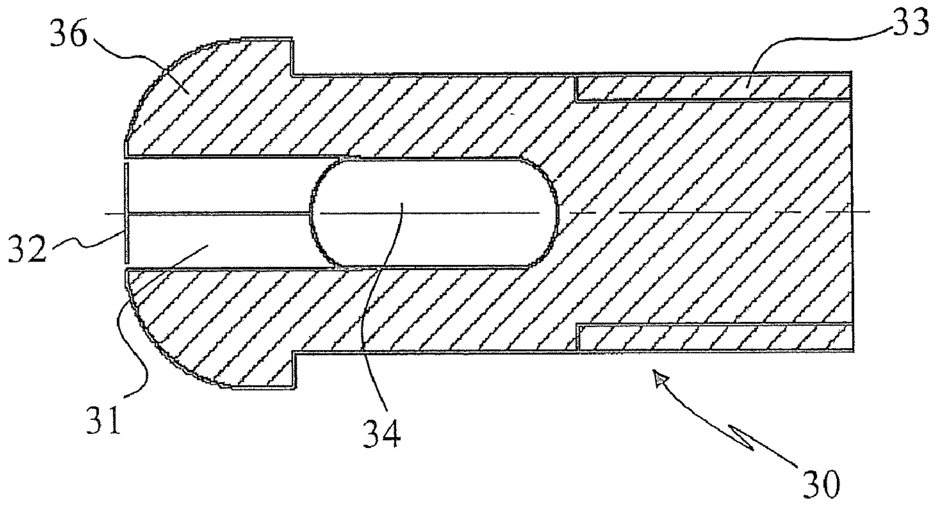

In the section views of FIGS. 2 and 3 it can be noted that each of the screw means 30 is formed by a pin having a threaded portion 33 on the outer surface thereof and, at the opposite end, a head portion 36 having a greater diameter with respect to the rest to allow it to abut against the outer surface of the lower plate 20.

Inside each pin an axial duct 31 is formed, which terminates in the head portion 36 with an outlet 32 open towards the outside to allow water delivery by the screw/nozzle 30.

The connection in fluid communication between the axial duct 31 and the distribution chamber 50 of the spray device (FIG. 5) is ensured by a transverse duct 34.

Figure 4:
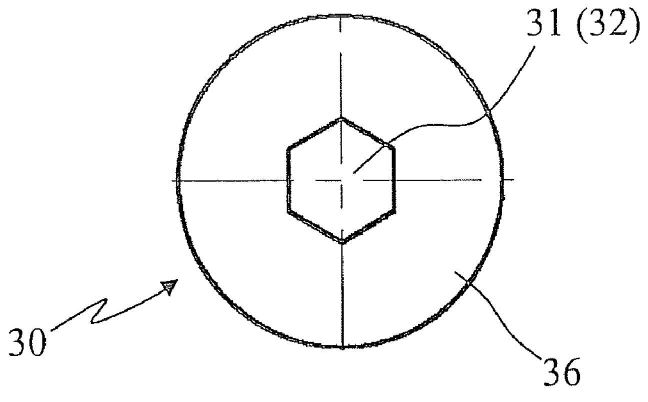
FIG. 4 is a plan view of the head portion of the screw shown in FIGS. 2 and 3.

A portion of the axial delivery duct 31 has a polygonal section in proximity to the outlet 32 to allow clamping or loosening of the pin by means of a tool. For example, as is highlighted in FIG. 4, the axial hole can have a hexagonal section to allow the use of a common "Allen" wrench (or hexagonal key), but other configurations can also be provided according to the tool to be used.

The pins can be made of plastic materials with high tensile strength, such as GRILAMID® TR55, or of metal materials such as steel or the like. In the case in which they are made of plastic materials, the pins having the function of screw/nozzle can also be transparent, for example to allow the passage of light which is projected from one or more sources towards the space in which water is delivered from the spray device.

To assemble a spray device according to the present invention, the screw means 30 are inserted in the through holes 23 of the lower plate 20. The elastic sealing ring 5 is then positioned on the plate 20 using as reference, or as support, the pins projecting from the screw means 30 to obtain correct positioning of the sealing ring. The assembly is then completed by positioning the upper plate 10, on which a supply coupling (not shown) has previously been mounted, to coincide with the hole 11, above the sealing ring 5 and screwing the screw means 30 into the threaded holes 13 preferably exerting the same tightening torque on each screw/nozzle 30, and if necessary tightening or loosening the screw if anomalies in water distribution to the nozzles or problems of peripheral seal of the spray device should occur.

Figure 5:
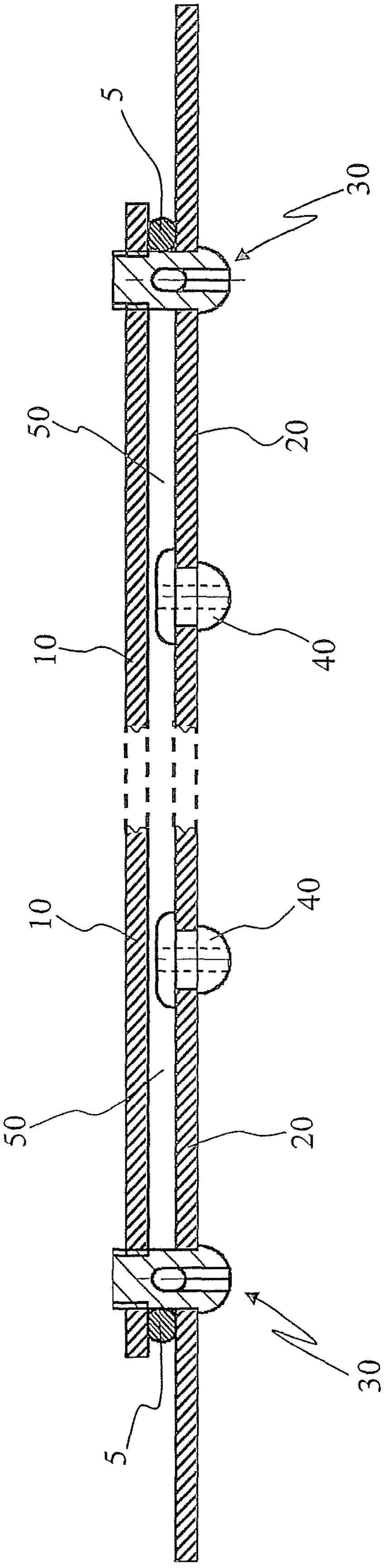
FIG. 5 is a section view of the peripheral portions of a spray device according to a possible embodiment of the present invention in assembled condition.

In assembled condition, the peripheral portions of the spray device appear schematically as those shown in FIG. 5, which also shows the nozzles 40 and the distribution chamber 50 delimited by the plates 10, 20 and by the sealing ring 5. The nozzles 40 can be of the type normally used in these products, for example nozzles made of elastomeric material and pressure-inserted in the holes 21, or maintained in position by appropriate locking means, such as elastic washers or the like.

The screws/nozzles 30 are positioned along a closed perimeter line which surrounds all the delivery nozzles 40, therefore coinciding with the lines along which the holes 13 and 23 are positioned on the respective plates 10 and 20.

It can be noted that the head portions 36 of the screws/nozzles 30 have a shape substantially similar to that of the nozzles 40, so as to be substantially imperceptible, except after careful observation, to avoid compromising the appearance of the spray device as a whole. However, if it is desirable to make the presence of the peripheral screws/nozzles 30 more evident, the head portions 36 could also have a significantly different shape and/or colour to the nozzles 40. For example, the head portion 36 could be made with a hexagonal or quadrangular shape to allow loosening or clamping using a common adjustable wrench of standard size.

Various modifications can be made to the embodiments shown here without departing from the scope of the present invention. For example, the shape of the spray device can be differ from circular, for example quadrangular or other more or less regular fancy shapes.

The holes formed in the upper plate 10 can also be smooth holes, and in this case clamping nuts should be provided for the screws 30.

The hexagonal hole of the duct 31 and of the outlet 32 can be positioned axially also in the threaded portion of the screw/nozzle 30. In the same manner, in place of a hexagonal hole for an "Allen" wrench, other systems can also be provided to allow clamping or loosening, such as slots for screwdrivers positioned at one of the two ends, or polygonal shapes even produced in an extension of the threaded portion.

What is claimed is:

1. A shower spray device including at least one lower plate, in which a plurality of water delivery nozzles are mounted, at least one upper plate, in which at least one inlet for the water supply is formed, at least one elastic sealing element, interposed between said two plates, to delimit therewith a chamber for distributing water to said nozzles, and screw means for clamping said elastic sealing element between said two plates, characterized in that said screw means include a plurality of threaded pins having at least one axial duct with an outlet open towards the outside to allow water delivery and at least one transverse duct to place said distribution chamber in fluid communication with said axial duct for water delivery.

2. The shower spray device as claimed in claim 1, wherein said pins are threaded on a portion of their outer surface and engaged in internally threaded holes of said upper plate.

3. The shower spray device as claimed in claim 1, wherein said pins are inserted in through holes of said lower plate and are provided with a head portion suitable to abut against the outer surface of said lower plate.

4. The shower spray device as claimed in claim 1, wherein said pins are installed along a closed perimeter line which surrounds said delivery nozzles.

5. The shower spray device as claimed in claim 1, wherein the axial duct of said pins has a portion with polygonal section in proximity to said outlet to allow clamping or loosening of the pin by means of a tool.

6. The shower spray device as claimed in claim 1, wherein said elastic sealing element is formed by a closed ring.

* * * * *